Nov. 14, 1933. R. L. MULLER Re. 19,001
PAPER FEEDING EQUIPMENT FOR ACCOUNTING MACHINES
Original Filed April 19, 1926 4 Sheets-Sheet 1
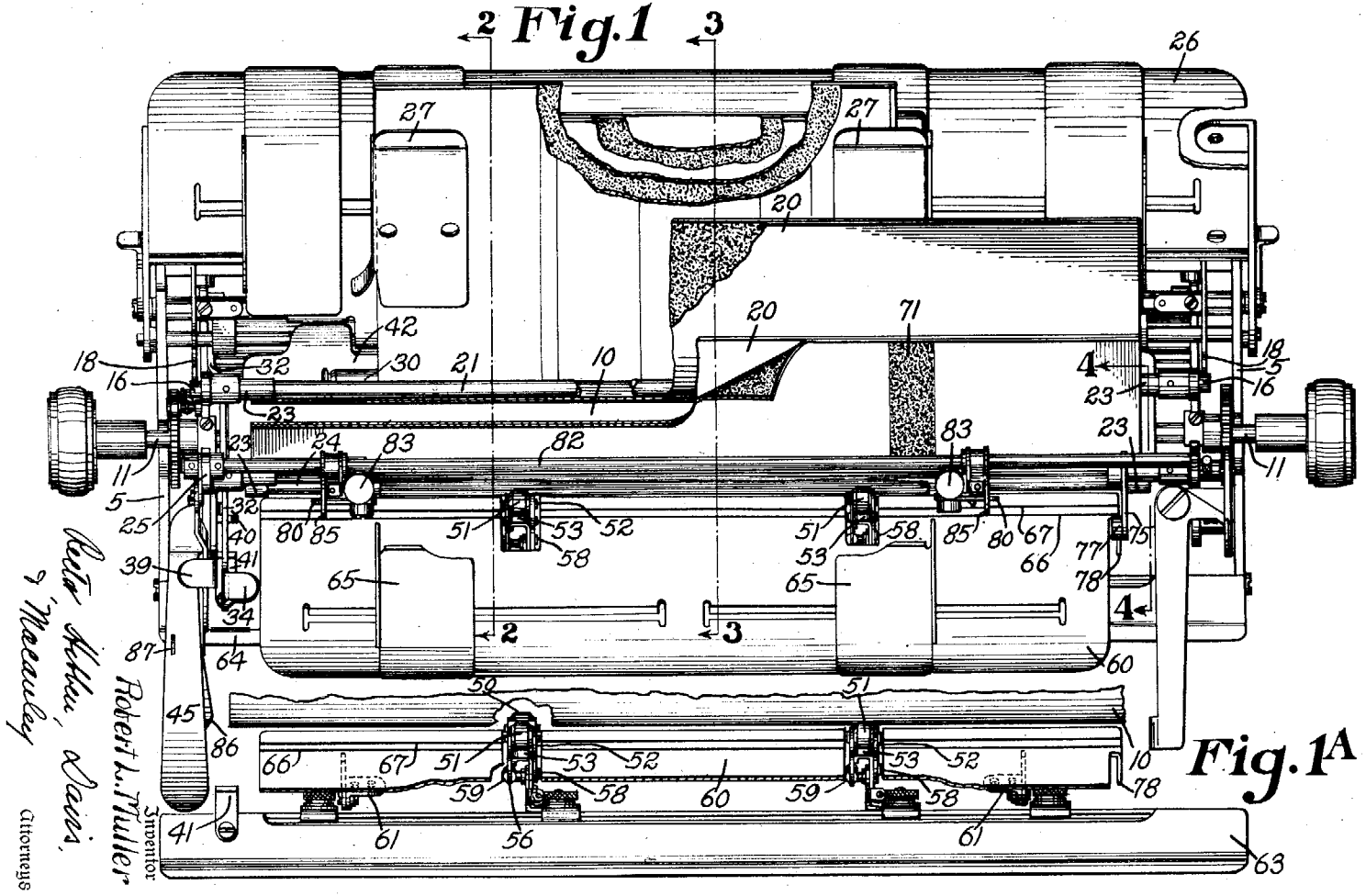
Inventor
Robert L. Muller
Rector, Hibben, Davis, & Macauley
Attorneys Nov. 14, 1933. R. L. MULLER Re. 19,001
PAPER FEEDING EQUIPMENT FOR ACCOUNTING MACHINES
Original Filed April 19, 1926 4 Sheets-Sheet 2
Fig. 4
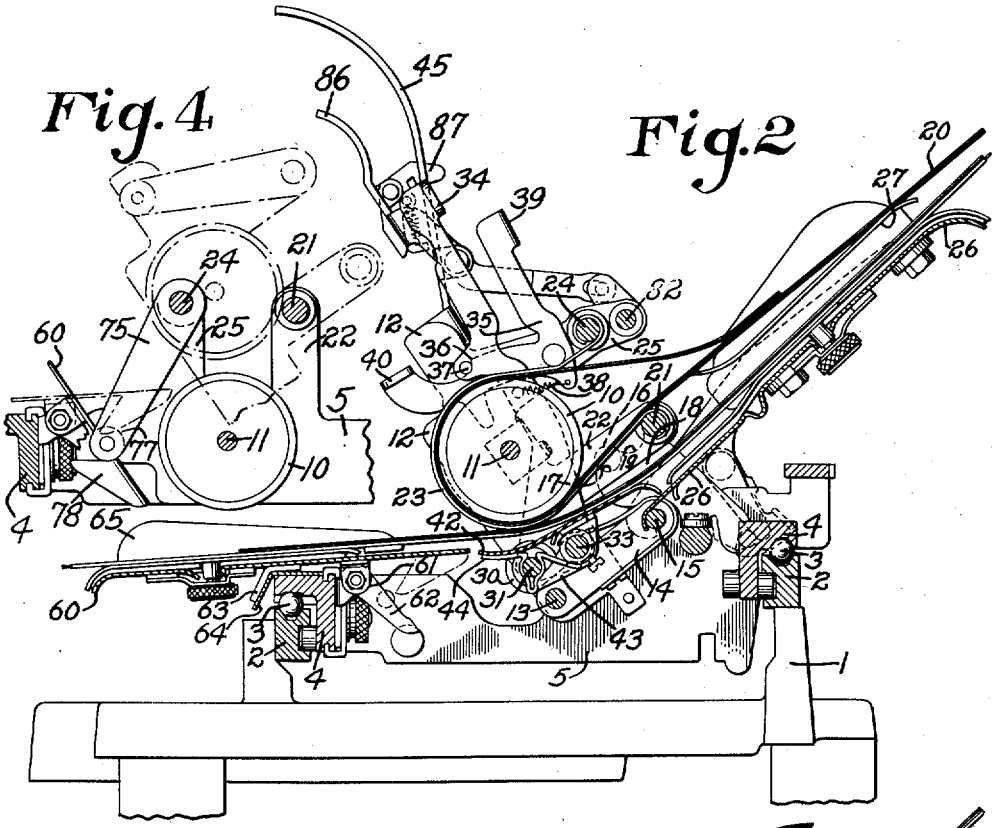
Fig. 2
Fig. 3
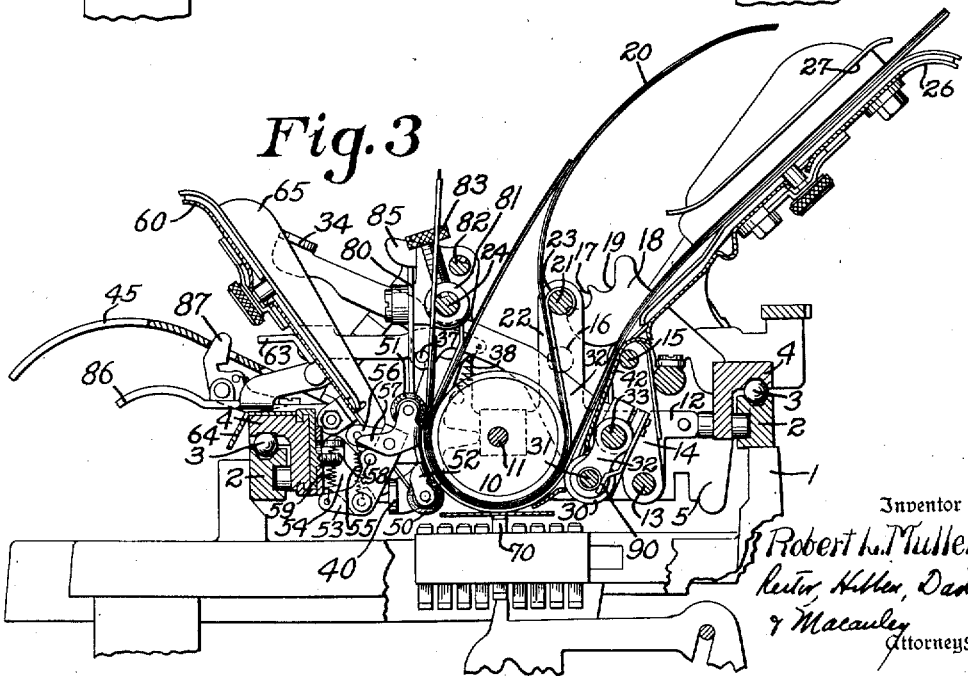
Inventor
Robert L. Muller
Reuter, Hibben, Davis & Macauley
Attorneys Nov. 14, 1933. R. L. MULLER Re. 19,001

PAPER FEEDING EQUIPMENT FOR ACCOUNTING MACHINES

Original Filed April 19, 1926 4 Sheets-Sheet 3

Inventor
Robert L. Muller

By Rector, Hibben, Davis, & MacCauley Attorneys

Nov. 14, 1933. R. L. MULLER Re. 19,001

PAPER FEEDING EQUIPMENT FOR ACCOUNTING MACHINES

Original Filed April 19, 1926 4 Sheets-Sheet 4

Inventor
Robert L. Muller
Rector, Hetten, Davis, & Macauley
Attorneys

Reissued Nov. 14, 1933

Re. 19,001

UNITED STATES PATENT OFFICE 19,001

PAPER FEEDING EQUIPMENT FOR ACCOUNTING MACHINES

Robert L. Muller, Detroit, Mich., assignor to Burroughs Adding Machine Company, Detroit, Mich., a corporation of Michigan Original No. 1,774,287, dated August 26, 1930, Serial No. 103,185, April 19, 1926. Application for reissue August 5, 1932. Serial No. 627,595

86 Claims. (Cl. 197—128)

The invention relates to paper feeding equipment for accounting machines.

It is desirable, in certain types of accounting machines, such as the Burroughs Moon-Hopkins billing machine to have a record sheet on which are recorded the entries on a number of customers' accounts, for example, all the entries on all customers' accounts for a given month. It is also necessary to enter these amounts on the individual ledger sheets for each customer and to make out a bill or statement at the same time, together with such copies as are necessary in the accounting system used. These individual ledger sheets and accompanying papers often differ in width from each other and from the record sheet. It is necessary to have some simple and easy way of feeding these sheets into the machine and they must also be properly collated because the ledger sheets may have entries on them and the succeeding lines of entries must be properly spaced from those already made. This must be done without disturbing the record sheet on which the entries should appear in proper spaced relation. The present invention relates particularly to a method and apparatus for feeding sheets of different width into an accounting machine and for collating the papers while positioning them in the machine.

The general object of the invention is to provide an improved method and apparatus for inserting papers in an accounting machine.

A more particular object is to provide an improved method and apparatus for collating papers in an accounting machine.

A further object is to provide a method and apparatus for collating in which collating marks are printed on the backs of the work sheets at the time entries are made thereon.

Another object is to provide a collating equipment in which the papers can be inserted from the front of the machine and collated while in horizontal position after which they can be clamped in place and moved to printing position.

A still further object is to provide an improved means for holding work papers against a platen so that, when the platen is raised to view the work, the papers will be held back out of the way.

Other objects and advantages of the invention will appear from the specification and drawings.

An embodiment of the invention is shown in the drawings in which:

Fig. 1 is a plan view of the mechanism with the parts in position for printing and with the work sheets broken away and turned back to show their arrangement and to distinguish between them.

Fig. 1A is a partial plan view with the feeding table broken away to show the parts beneath it.

Fig. 2 is a cross section on the line 2—2 of Fig. 1 with the platen in elevated position, the collating table in horizontal position, and the sheets in place preparatory to moving the platen to lowered or printing position.

Fig. 3 is a section on the line 3—3 of Fig. 1 showing the platen in lowered or printing position.

Fig. 4 is a diagrammatic view on the line 4—4 of Fig. 1, showing in full lines the platen and collating table when in printing position and in dotted lines the same parts when in collating position.

Figure 10:
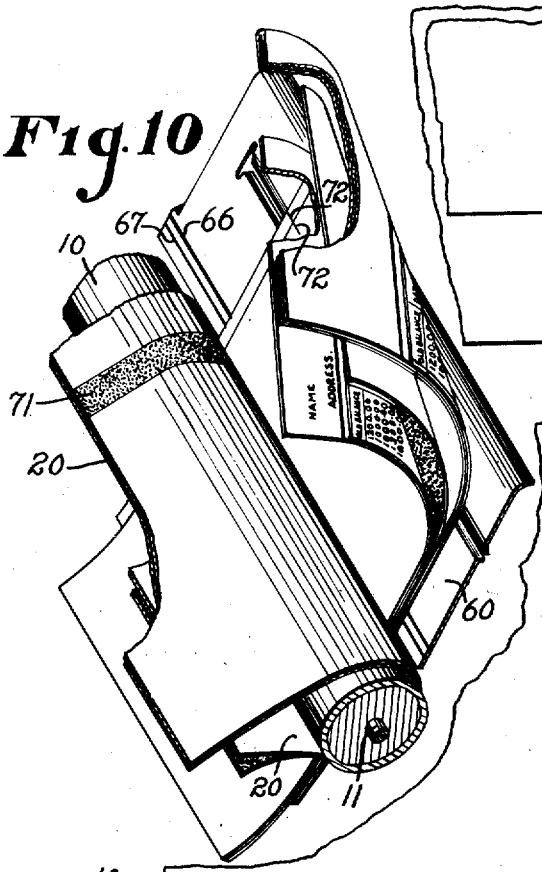
Fig. 10 is a perspective view with some of the parts in cross section and with the work sheets broken away to more clearly show their arrangement when inserted in the machine.

The invention is shown attached to a Burroughs Moon-Hopkins billing machine, the upper portion of the frame 1 of which is shown in Fig. 2. This frame supports transverse guides 2 having race-ways in their upper edges for receiving ball-bearings 3 positioned between the frame guides and corresponding guides 4 on the traveling paper carriage, the latter having side or frame plates 5 for supporting the carriage mechanism. The paper carriage is stepped across the machine transversely and a platen feeding mechanism is provided for automatically advancing the platen, but the present specification will not be confused by describing these mechanisms in detail, reference being made to Hopkins' Patent No. 1,336,904.

The carriage has a platen 10, whose shaft 11 is rotatably mounted in movable side plates 12 pivoted on a shaft 13 connected by links 14 to a shaft 15 journaled in the side plates 5 of the carriage. This mounting of the platen permits it to be swung forward and down from the raised position shown in Fig. 2 to the printing position shown in Fig. 3 and vice versa. When raised it normally occupies the position shown in Fig. 2 in which rollers 16 on the sides of the movable side plates 12 occupy the forward notches 17 in plates 18 on the carriage frame. It may be positioned slightly higher and farther to the rear to give a better view of the items being entered by moving the platen up and back until the rollers 16 engage in the rear notches 19 in the plate 18. This exposes the printing line on the platen more clearly. The plates 12 and the parts that connect them form a rockable platen frame for moving the platen into and out of printing position.

The record sheet 20 is fed under the platen from the rear as illustrated in Fig. 2. It passes over a guide rod 21 mounted on the arms 22 of the platen side plates 12 and around and over the platen as illustrated. For the purpose of guiding and holding it in position, spring guide plates 23 are provided which are bent around the guide rod 21, pass around the platen and are bent around a cross rod 24 mounted in arms 23 of the side plates 12. The number of record sheets used may be varied to suit the requirements, the drawings showing one, outside of which would normally be located a carbon sheet.

The individual work sheets are fed from the front as illustrated in Fig. 2 and pass under the platen and to the rear under the record sheet. A rear apron 26 supports the sheets after they pass the platen and adjustably mounted on this apron are guides 27 for guiding the sheets and for spacing the record sheet from them as shown in Fig. 2.

The papers are held in engagement with the platen by feed rollers 30, it being understood that the platen is rotated step by step during operation of the machine and that the feed rollers hold the paper in contact with the platen so that, as the latter is rotated, the paper is fed forward. A series of these feed rollers 30 is provided mounted on a shaft 31 carried by movable plates 32 pivoted on the cross shaft 33. The left-hand plate 32 has an operating or handle extension or finger piece 34 by means of which the feed rollers are moved into and out of engagement with the platen to open and close the "throat" into which the front-fed work sheets are introduced. The feed rollers are normally urged toward the platen to clamp the paper against it by springs 90 bearing against the cross shaft 31 carrying the rollers. Depressing the finger piece 34 causes the plates 32 to rock counterclockwise about the shaft 33 to move the rollers away from the platen against the tension of the springs. This finger piece 34 may be depressed at the will of the operator, but it is usually depressed at the same time that the platen is moved out of printing position. The platen is moved by lifting a handle piece 45. The finger piece 34 is conveniently located so that the operator can grasp it at the time he grasps the handle 45. The operator can place his left thumb beneath the handle 45 to raise it, and, at the same time, use the first or second finger of the left hand for depressing the finger piece 34 as the platen is lifted out of printing position. He thus lifts the platen out of printing position and simultaneously moves the lever 34 to open the front-feed throat for the work sheets.

The finger piece 34 may be latched in place to hold the feed rollers away from the platen to hold the parts in "open throat" position by means of a latch 35 pivoted on the arms 25 of the left-hand side plate 12 and having a shoulder 36 engaging over a stud 37 on handle 34. The latch is normally urged in a clockwise direction by a spring 38 so that, when the lever 34 is depressed, the latch snaps to position to cause the shoulder 36 to take a position above in front of stud 37 to hold the lever in depressed position with the feed rollers spaced from the platen. The latch may be released by depressing the thumb piece 39 which moves the shoulder 36 from in front of the stud 37 and permits the lever with the feed rollers to be snapped back to normal position by the springs 90 to thereby cause the feed rollers to engage the work sheets and press them against the platen. The latch also has a forward extension 40 by means of which it can be tripped, but this extension is primarily for the purpose of engaging a stop 41 on the paper carriage when an attempt is made to lower the platen when the feed rollers have not been moved into engagement with the work sheets. It will be appreciated that it would be undesirable to have the machine operated with the feed rollers away from the platen and the papers loose in the machine. Accordingly, the stop 41 has been provided which will engage the projection 40 on the latch to arrest the platen before it has reached its printing position unless the latch has been tripped to free the lever 34 in which case it will clear the stop. An operator familiar with the machine will notice that the platen has not moved down sufficiently and will thereby be notified that the feed rollers have not been moved into engagement with the platen. Should he not notice this, the platen is nevertheless far enough removed from printing position so that no printing action will take place and the first operation of the machine will immediately indicate to the operator that it is not properly adjusted.

A lower paper guiding apron 42 is mounted adjacent the feed rollers to form a surface over which the individual sheets may pass. This apron is carried by arms 43, pivotally mounted on the cross shaft 33. It is necessary that this apron move away from the platen at the same time that the feed rollers are moved away and, for this purpose, the arms 43 are provided with forwardly extending portions which are engaged by the cross shaft 31 carrying the feed rollers as the shaft moves away from the platen. This carries the apron away from the platen with the feed rollers. When the apron is returned into engagement with the work sheets with the feed rollers, it is desirable to have its front edge in close engagement with sheets and, to insure this, a spring 44 is provided which engages the front edge of the apron, surrounds the feed roller shaft 31 and bears against the shaft 31.

From the above description, it will be clear that, when the lever 34 is depressed, both the apron 42 and the feed rollers 30 will be moved away from the platen so as to give ample space for the separate sheets to be freely fed under the platen. After the work sheets are positioned, the latch 35 is tripped, whereupon the apron and the feed rollers are snapped against the work sheets to hold them in position.

After the papers have been clamped or as they are clamped against the platen the platen is lowered from the position of Fig. 2 to that of Fig. 3 by lifting the platen slightly and lowering it by means of the hand piece 45 illustrated in Fig. 2. The front-feed throat for the work sheets should be closed and the sheets gripped before the platen is lowered any substantial distance as the work sheets might otherwise move out of proper position while the platen is being lowered. This is accomplished by tripping the latch 35 to release the feed rolls. This tripping action can occur before the platen moves or it can occur simultaneously with the start of the platen movement. The operator can very easily grasp the thumb piece 39 of latch 35 with his thumb at the same time that he grasps the platen hand piece 45 with his fingers. He can release the latch 35 with his thumb before he moves the platen or he can release the latch as he moves the platen. In this way the inserted work sheets are gripped before the platen is moved, or before it has moved any substantial distance, because, as soon as the latch 35 is released, the feed rolls 30 snap into engagement with the platen to close the front-feed throat and grip the work sheets.

It is desirable that the work sheets be smoothly wrapped about the platen as it is lowered and held tightly in engagement with it particularly across the printing line and, for this purpose, two or more sets of roller devices are employed. Each set of rollers comprises a lower roller 50 and an upper roller 51 (Figs. 1 and 3) mounted in a yoke piece 52 pivoted on a bell crank lever 53 which, in turn, is pivoted on an arm 54 of an adjustable bracket clamped to the carriage frame. A spring 55 is connected to one arm 56 of the yoke, the other end of the spring being connected to the pivot of the lever 53. The spring thus urges the yoke in a counter-clockwise direction and normally projects the lower roller farther forward than the upper, the position of the yoke being determined by the engagement of the arm 57 of the yoke with a stud 58 on the lever 53. The lever 53 is normally urged in a clockwise direction by a spring 59 one end of which is connected to the bracket arm 54 and the other to the forwardly extending arm of the bell crank lever. The position of the lever is determined by the engagement of its forward-extending arm with the under side of the bracket as illustrated in Fig. 3. The rollers 50 and 51 are thus normally urged toward the platen by the spring 59 which tends to turn the bell crank lever clockwise and the lower roller is projected farther forward than the upper roller by the spring 55 which tends to rotate the yoke 52 counterclockwise. As the platen is lowered, the lower roller first engages the paper not far from where it is held by the feed rollers and, as the lowering action continues, this roller progressively presses the paper smoothly and tightly against the platen until, when the platen is about in its printing position on the upper roller engages the paper and the two hold it firmly in position with the unfed ends substantially vertical. This action wraps the paper evenly on the platen without permitting looseness or wrinkles and holds it firmly in position to permit the type to print distinctly. The pivotal mounting of the bell crank lever permits the roller device to move rearwardly to accommodate itself to different thicknesses of work sheets. The number of sets of rollers may be varied to meet the requirements for different widths of paper carriage.

As previously stated, it is necessary to properly position the separate work sheets or to collate them when inserting them in the machine. This is necessary because they often have certain items entered on them and the next series must be in proper relation to the first. This positioning must occur without disturbing the record sheet 20. In other words, the separate sheets must be collated and inserted into the machine without disturbing the record sheet and so that they are properly coordinated with it.

A feeding and collating table 60 is provided comprising a flat metal table having brackets 61 projecting from its lower surface and pivoted to the carriage frame. The table may be tilted rearwardly on these pivots to the position illustrated in Fig. 3, such position being determined by the engagement of the table with stops 62 on the carriage frame. The table is balanced so that it normally occupies a horizontal position limited by engagement of angular stops 63 with the carriage indexing guide 64. Laterally adjustable guides 65 are carried by the table for positioning the papers laterally.

The table has two collating marks on it in the form of reference lines 66 and 67 (Fig. 9) by means of which the work sheets are positioned. The position of these marks on the table is such that, if the papers are positioned relative to them in the manner hereinafter described, said papers will be in the proper relative position to the printing line and to the continuous record strip when the platen is moved to printing position.

Figure 8:
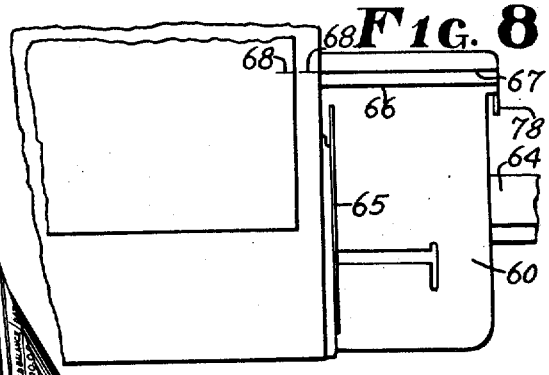
Fig. 8 is a fragmentary plan view of a portion of the collating table showing the manner in which the work sheets are positioned for collating them for the first line of printing.
Figure 9:
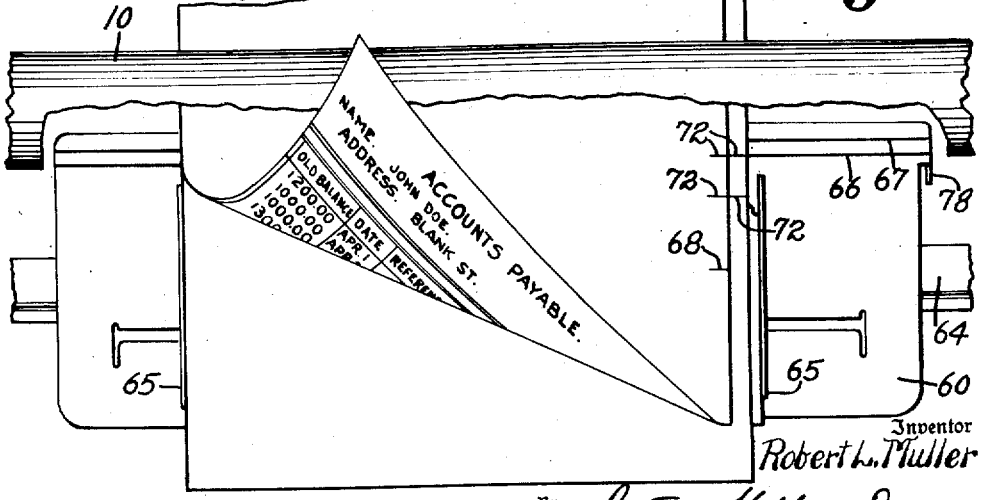
Fig. 9 is a fragmentary plan view similar to Fig. 8, but showing the manner in which the work sheets are positioned for collating them after items have been previously printed on them.

The ledger and statement forms are printed with marking lines 68 on them near the top of the sheet (Fig. 8) for positioning them for the first entry. When the first entry is to be made, these sheets are positioned under the platen from the front with the bottom edges of the sheet fed first as illustrated in Fig. 9. The sheets are positioned with the lines 68 coincident with the line 67 on the collating table. After the papers have been thus positioned, the latch 35 is tripped and the papers are clamped against the platen by the feed rollers after which the platen is lowered to printing position. The first series of items will then be entered at the proper distance below the heading on the form.

After a line of entries has been printed, a type 70 is operated which strikes the sheets, such type carrying a mark, preferably a short line or dash for purposes hereinafter described. The detail of how the type bar is operated need not be described here as the standard Moon-Hopkins machine is provided with a printing mechanism, a portion of which is illustrated in Fig. 3, and the type bar 70 is operated in the same manner as the usual type bars.

A wide carbon sheet is located between the record sheet and the ledger sheet for making carbon impressions on the record sheet. On the back of this carbon sheet is a narrow carbon strip 71 positioned so as to overlie the edges of the ledger sheet and the sheet next to it as shown in Fig. 10, it being understood that the ledger sheet is narrower than the statement sheet below it. When the type 70 strikes the sheets, this carbon strip causes a collating mark to be printed on the back of the ledger sheet and the sheet next below it (Fig. 10). The number of sheets on which the mark appears can, of course, be varied to suit the requirements.

When the ledger and statement sheets are inserted in the machine again, as for example at the beginning of the next posting, their left hand edges are positioned against the guide 65 and the collating lines are placed coincident with the line 66 on the collating table. This positions the sheets so that when they are clamped against the platen and items are entered after the platen has been lowered to printing position, these items will be in the proper position beneath the previous entries. At the end of the next posting new collating lines will be printed on the back of the sheets for use when the sheets are subsequently put into the machine. The operation is thus continuous—that is, as each series of entries are finished new collating marks are printed on the backs of the sheets to be used in the next posting.

It will thus be seen that a method of collating has been provided in which the sheets are positioned in front of a platen and relative to a collating mark adjacent the platen. This is done while they are being placed in feeding position. The papers are then clamped in position, moved to the printing line, items are entered, and new collating marks made on the backs of the sheets for subsequent use. The collating occurs while the sheets are in horizontal position on a conveniently located feed table and while the sheets are free to be positioned under the platen.

As the platen is moved from its elevated to its lowered or working position it strikes the collating table and tilts it to the position shown in Fig. 3. This moves it from its position directly over the indexing strip 64 on the carriage and into a position where it will not interfere with a view of the indexing strip or with the lateral movement of the carriage. It is desirable to have the edge of the table removed from the work sheets and for this purpose an arm 75 is carried by a cross shaft 24 on the carriage. This arm carries a roller 77 which, as the platen carriage moves downwardly, engages a projecting member 78 on the collating table and tilts it to its final position against the stops 62 thereby removing its edge from the work sheets. When the platen is raised the collating table is released and it moves to a horizontal position by gravity.

Figures 5, 6, 7:
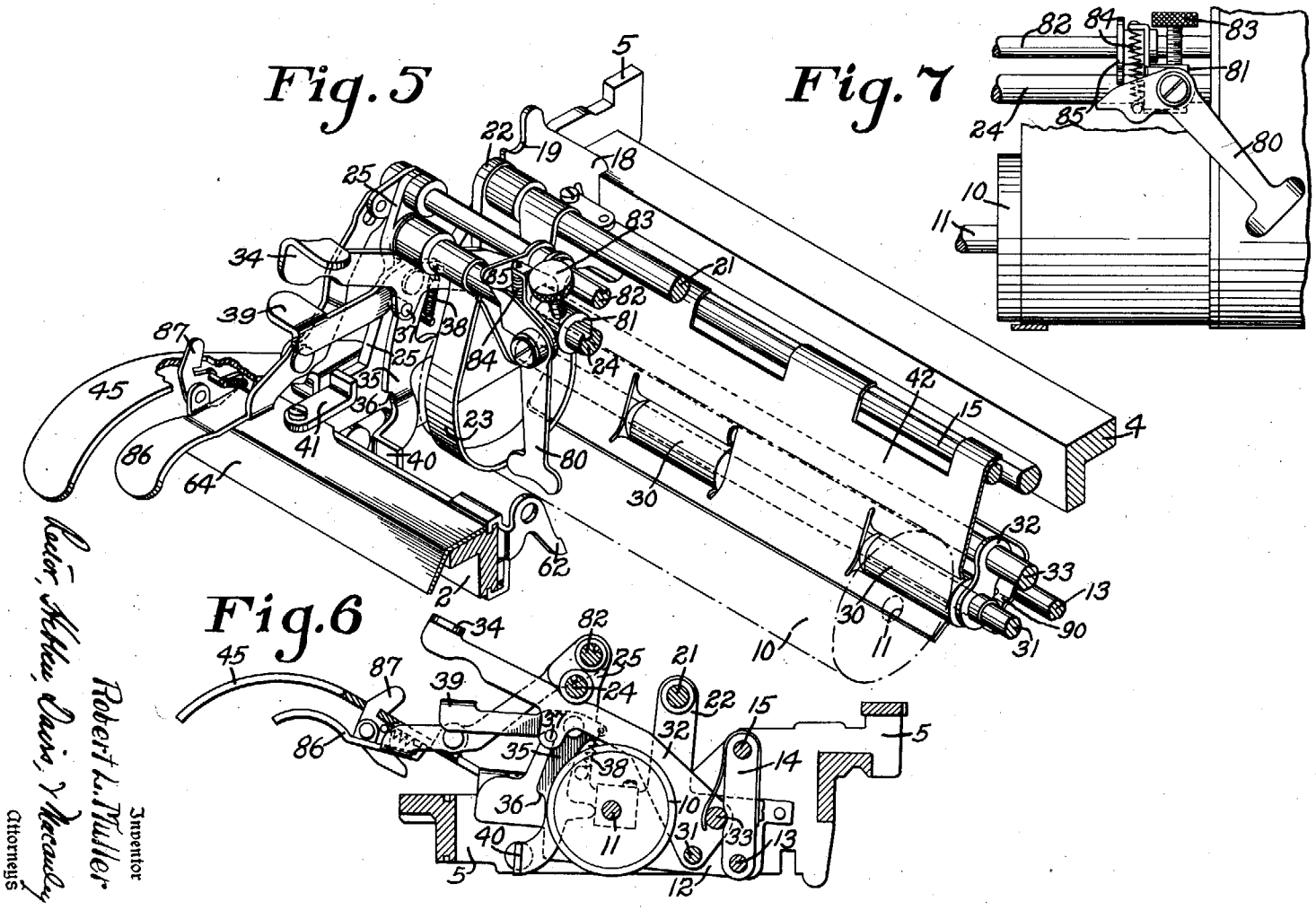
Fig. 5 is a fragmentary perspective view of the paper carriage and platen mechanism with certain of the parts removed to show others more clearly.
Fig. 6 is a diagrammatic section showing the means for controlling the feed rollers which clamp the work sheets against the platen.
Fig. 7 is a fragmentary front elevation showing the left-hand paper finger in position to hold the work sheets against the platen.

When the platen is moved to its highest position to inspect the line of entries that is being made it is desirable to have the projecting papers held back against the platen so that they will be out of the way and will not fall forward. For this purpose two fingers 80, the left one of which is shown in detail in Fig. 7, have been provided which are pivoted on bearings 81 adjustably mounted on the cross shafts 24 and 82. The bearings are held in position by the set screws 83 and the fingers are normally held in a vertical position as shown in Fig. 5 by springs 84 connected at one end to the brackets on the bearings and at the other to the arms on the fingers. These fingers are the shape of elbow levers and the laterally projecting arms thereof have cams surfaces which are engaged by cams 85 carried by the rock shaft 82. This shaft is rocked by means of a finger piece or lever 86 pivoted to the handle 45, and connected by a pin and slot connection with an arm on the end of the shaft as illustrated in Fig. 5. The finger piece is positioned so that as the operator clasps the handle 45 to raise the platen carriage for inspecting an entry, he can also grasp this finger piece and the lifting action turns the finger piece clockwise as viewed in Fig. 5 which rocks the shaft 82 to cause the cams to engage the ends of the fingers to turn them toward each other longitudinally of the platen to the position shown in Fig. 7 in which position they are over the work sheets and serve to hold them against the platen. This action takes place automatically in the sense that the operator grasps the thumb piece at the time he lifts the carriage and it is not necessary for him to operate any separate lever to hold the paper against the platen.

The finger piece is latched in position by a latch 87 extending through a slot in the handle 45, and having a notch which engages over the edge of the slot in the handle when the finger piece 86 reaches its locked position. The finger pieces are thus locked in position to hold the papers against the platen. When the platen is lowered to printing position, the end of this latch engages the carriage as shown in Fig. 6 where the latch is just about to engage the carriage. It is thus automatically tripped as the platen carriage is lowered, and the fingers are automatically released, and they are moved by their springs to vertical position out of engagement with the papers. Accordingly, as the platen is lowered to working position, the fingers are automatically released from the paper and when the platen is raised to its elevated position the fingers automatically move over the paper to hold it against the platen to facilitate inspection of the entries being made.

It will be understood that the construction shown is for purposes of illustration and that variations may be made in it without departing from the spirit and scope of the invention as defined by the claims.

I claim:

1. The combination in an accounting machine of a platen movable to and from printing position, a table mounted independently of the platen for positioning papers horizontally in feeding relation to said platen, feeding rolls for clamping the papers to the platen while they are in horizontal position, and means for moving the platen to printing position.

2. The combination in an accounting machine of a platen adapted to be lowered to and raised from printing position, a table for positioning papers horizontally under said platen from the front while it is raised, feed rolls for clamping the papers to the platen while it is raised, and means for lowering the platen to printing position.

3. The combination in an accounting machine a rotatable platen movable to and from printing position, feed rolls normally urged into engagement therewith, controlling mechanism for moving the feed rolls out of engagement with the platen and for holding them in such position, a feeding and guiding means mounted independently of the platen for positioning work sheets horizontally between the platen and feed rolls, said controlling mechanism having provisions for releasing it to permit the feed rolls to clamp the sheets against the platen while they are in horizontal position, and means for moving the platen to printing position after the sheets have been clamped to it.

4. The combination in an accounting machine of a platen movable to and from printing position, a table for positioning papers horizontally in feeding relation to said platen, feed rolls for clamping the papers to the platen while they are in horizontal position, means for moving the platen to printing position, and means for preventing the platen from being moved to printing position when the feed rolls have not been moved to clamp the papers to the platen.

5. The combination in a machine of the class described of a platen movable to and from printing position, movable feed rolls, controlling means for moving said rolls into and out of engagement with the platen, a latch for holding said means in position to hold the rolls out of engagement with the platen, and means for preventing the platen from being moved to printing position when the latch is so holding said controlling means.

6. The combination in a machine of the class described, of a platen movable to and from printing position, feeding rolls, controlling means for moving said rolls into and out of engagement with the platen, a latch for holding said controlling means in position to hold the rolls out of engagement with the platen, said latch being movable with the platen as it moves to and from printing position, and means for engaging said latch to prevent the platen from being moved to printing position when it is moved with the latch holding the controlling means with the rolls out of engagement with the platen.

7. The combination in an accounting machine of a platen adapted to be lowered to and raised from printing position, a table for positioning papers horizontally under said platen from the front while it is raised, feed rolls for clamping the papers to the platen while it is raised, means for lowering the platen to printing position, and means for moving the unfed ends of the papers to a substantially vertical position as the platen is lowered.

8. The combination in an accounting machine of a platen movable to and from printing position, feed rolls normally in engagement with the platen, means for holding the feed rolls out of engagement with the platen, a horizontal table in front of the platen by means of which papers can be positioned horizontally between the platen and the feed rolls and clamped against the feed rolls by releasing the feed roll holding means, means for moving the unfed ends of the paper to substantially vertical position and for holding them across the printing line when the platen is moved to printing position.

9. The combination in an accounting machine of a platen movable to and from printing position, guiding means for positioning papers horizontally in feeding relation to said platen, feeding rolls for clamping the papers to the platen while they are in horizontal position, means for moving the unfed ends of said papers to substantially vertical position as the platen is moved to printing position, said last named means freeing the unfed ends of the papers as the platen is raised from printing position, and holding means operable to hold the papers in substantially vertical position relative to the platen when the platen is raised from printing position.

10. The combination in an accounting machine of a platen movable to and from printing position, guiding means for positioning papers horizontally in feeding relation to said platen, feeding rolls for clamping the papers to the platen while they are in horizontal position, means for moving the unfed ends of said papers to substantially vertical position as the platen is moved to printing position, said last named means freeing the unfed ends of the papers as the platen is raised from printing position, and holding means operable to hold the papers in substantially vertical position relative to the platen when the platen is raised from printing position, and means for automatically releasing the holding means when the platen is moved to printing position.

11. The combination in an accounting machine of a platen movable to and from printing position, feed rolls normally in engagement with the platen, means for holding the feed rolls out of engagement with the platen, a horizontal table in front of the platen by means of which papers can be positioned horizontally between the platen and the feed rolls and clamped against the feed rolls by releasing the feed roll holding means, means for moving the unfed ends of the paper to substantially vertical position and for holding them across the printing line when the platen is moved to printing position, said last named means releasing the paper as the platen is moved from printing position, holding means for holding the paper in its vertical position relative to the platen when the platen is raised, and means for automatically releasing the holding means when the platen is moved to printing position.

12. The combination in an accounting machine of a platen movable to and from printing position, feed rolls for holding papers against said platen, means for holding said papers about said platen when it is in printing position so that said papers are in substantially vertical position at the front of the platen, said means being automatically disabled as the platen is moved away from printing position and automatically enabled as the platen is moved to printing position, auxiliary means operable to hold said papers about the platen when said platen is moved out of printing position, and means for automatically disabling said auxiliary means as the platen is moved to printing position when said first means becomes operable.

13. The combination in an accounting machine of a platen adapted to be lowered to and raised from printing position, means for guiding record sheets under said platen from the rear and around the same and for holding said sheets in engagement with the platen, a table in front of the platen for positioning work sheets horizontally under said platen from the front while said record sheets remain undisturbed, feed rolls for clamping said record and said work sheets to the platen while it is out of printing position, and means for lowering the platen to printing position.

14. The combination in an accounting machine, of a rotatable platen movable to and from printing position, feeding rolls normally urged into engagement therewith, controlling mechanism for moving the feeding rolls out of engagement with the platen and holding them in such position, means for guiding a record sheet under said platen from the rear and around the same while the platen is out of printing position and the feeding rolls are out of engagement with it, means for guiding work sheets under said platen from the front while it is raised and the feed rolls are out of engagement therewith, said controlling mechanism including a device by means of which it may be released to permit the feed rolls to move into engagement with the platen to clamp the record and work sheets against same, and means for moving the platen and clamped sheets to printing position.

15. The combination in an accounting machine of a rotatable platen, means for guiding record sheets under and around said platen from the rear, means for guiding work sheets under said platen from the front, an apron at the rear of the platen for supporting the work sheets to the rear of the platen, means on said apron for guiding the work sheets laterally and for spacing the record sheets from said work sheets, and feeding rolls for holding said work and said record sheets in engagement with the platen.

16. The combination in an accounting machine of a platen movable to and from printing position, means for guiding record sheets under said platen from the rear, means for holding said record sheets around said platen with the front ends of the sheets in substantially vertical position, a paper table mounted in front of said platen for positioning work sheets under said platen from the front while the platen is raised from printing position, means for releasing said platen to permit it to move to printing position, and pressure rolls for automatically clamping the record and work sheets to the platen when it is moved toward printing position and prior to its reaching said position.

17. The combination in an accounting machine of a platen, guiding means for guiding a record sheet under and around said platen from the rear, collating means positioned in front of the platen so that work sheets may be fed under the platen from the front and collated relative to the record sheet while in feeding position, guiding means for guiding the work sheets to the rear of the platen and for spacing them from the record sheet, and feeding rolls for holding the record and work sheets in engagement with the platen.

18. The combination in an accounting machine of a platen movable to and from printing position, said platen being urged toward printing position, means for holding said platen out of printing position when it is moved to such position, means for guiding a record sheet around said platen from the rear including devices for holding said record sheet on said platen, a feeding table mounted in front of said platen for guiding work sheets under said platen from the front while said platen is out of printing position, means for releasing said platen to permit it to move to printing position, and means operable simultaneously with the release of said platen for clamping the record sheet and work sheets to the platen to hold them firmly in position while the platen moves toward printing position.

19. The combination in an accounting machine of a platen movable to and from printing position guiding means for guiding a record strip under said platen from the rear and around the same, a collating table mounted in front of said platen over which work sheets may be fed under said platen from the front, collating means on said table for collating the work sheets relative to each other and to the record strip, and feed rolls operative to clamp the work sheets and record strip to the platen while the platen is out of printing position.

20. The combination in an accounting machine of a platen movable to and from printing position, said platen being urged toward printing position, means for holding said platen out of printing position, a paper table movably mounted in front of said platen and independently thereof for positioning papers under said platen from the front while it is out of printing position, means for releasing said platen to permit it to move to printing position, and pressure rolls for automatically clamping the papers to the platen prior to its reaching its printing position, said platen having provisions for moving said table out of position to interfere with it as said platen moves to printing position.

21. The combination in an accounting machine of a platen adapted to be lowered to and raised from printing position, a movable table for positioning papers horizontally under said platen from the front while the platen is raised, feed rolls for clamping the papers to the platen, and means for lowering the platen to printing position, said platen, as it is lowered, engaging the table to move it to inclined position.

22. The combination in an accounting machine of a platen adapted to be lowered to and raised from printing position, a movable table for positioning papers horizontally under said platen from the front while the platen is raised, feed rolls for clamping the papers to the platen, means for lowering the platen to printing position, said platen, as it is lowered, engaging the table to move it to inclined position, and means operated by movement of the platen to its final printing position for moving the table out of engagement with the platen.

23. The combination in an accounting machine of a rotatable platen adapted to be lowered to and raised from printing position, feeding rolls normally urged into engagement therewith, controlling mechanism for moving the feeding rolls out of engagement with the platen and holding them in such position, a substantially horizontal feeding table in front of the platen over which work sheets may be fed under the platen from the front while in horizontal position, said controlling mechanism including a device by means of which it may be released to permit the feeding rolls to move to normal position to clamp the work sheets against the platen, and means for tilting the feeding table to inclined position as the platen is moved to printing position.

24. The combination in an accounting machine of a platen movable to and from printing position, a pivoted feeding and paper positioning table normally in a horizontal position, said table being positioned to be engaged by the platen and moved to an inclined position as the platen is moved toward printing position, and means actuated as the platen moves to final printing position for moving the table out of engagement with the platen.

25. The combination in an accounting machine of a platen rotatably mounted on a movable carriage by means of which it may be moved to and from printing position, a pivoted feeding and paper positioning table normally in horizontal position, said table being positioned to be engaged and tilted by the platen as it is moved toward printing position and means carried by the platen carriage engaging a projection on the table for moving the table out of engagement with the platen as the platen approaches printing position.

26. The combination in an accounting machine of a rotatable platen adapted to be lowered to and raised from printing position, feed rolls normally urged into engagement with said platen, controlling mechanism for moving said feed rolls out of engagement with the platen and holding them in such position, a combined feeding and collating table mounted in front of the platen on which work sheets may be collated while in horizontal position and positioned between the feed rolls and the platen, said controlling means including a device by means of which it may be released to permit the feed rolls to move into engagement with the platen to clamp the papers thereagainst, and means for lowering the platen to printing position and simultaneously tilting the feeding and collating table.

27. The combination in an accounting machine of a platen movable to and from printing position, a collating table pivotally mounted in front of the platen, means for collating work sheets on said table while it is in horizontal position, and means for moving the platen to printing position and simultaneuosly tilting the collating table.

28. The combination in an accounting machine of a platen movable to and from printing position, a collating table mounted in front of the platen for collating papers face downward in horizontal position in front of the platen and under the same from the front, feed rolls for clamping the collated papers to the platen while the platen is out of printing position, and means for moving the platen to printing position and moving the papers out of engagement with the collating table.

29. The combination in an accounting machine of a platen, a collating table mounted in front thereof and provided with collating marks thereon, and means for printing collating marks on the back of sheets on which entries are made so that said sheets may be collated relative to the marks on the table when next inserted in the machine.

30. The combination in an accounting machine of a platen, a collating table mounted in front thereof with a collating mark thereon by means of which papers may be collated relative to said platen from the front, and means for printing a collating mark on the back of the papers for use in the succeeding collating operation.

31. The combination in an accounting machine of a platen movable to and from printing position, a collating table mounted in front of said platen with a collating mark thereon by means of which papers may be collated face downward relative to said platen from the front while the platen is out of printing position, means for clamping the collated papers to the platen while it is out of printing position, means for moving the platen to printing position, and means for printing a collating mark on the back of the papers for use in the succeeding collating operation.

32. The combination in an accounting machine of a platen movable to and from printing position, feed rolls movable into and out of engagement with the platen, a horizontal table mounted in front of the platen and having a collating mark for collating papers while in feeding relation to the platen with the feed rolls out of engagement therewith, means for causing the feed rolls to be moved into engagement with the papers to clamp them to the platen after they have been collated and while the platen is out of printing position, means for lowering the platen to printing position, means for moving the papers to a substantially vertical position out of engagement with the table as the platen moves to printing position, and means for tilting the table as said platen moves to printing position.

33. The combination in an accounting machine of a platen movable to and from printing position, feed rolls for clamping work sheets to said platen while it is out of printing position, and means for progressively engaging and moving over the work sheets in a direction away from where they are held and across the printing line as the platen is moved toward printing position to press the work sheets evenly about the platen, and to hold them tightly against the platen across the printing line.

34. The combination in an accounting machine of a platen movable to and from printing position, feed rolls for clamping work sheets to said platen while it is out of printing position, and sets of resiliently mounted rollers positioned so as to progressively engage the work sheets from adjacent the line where they are clamped to the platen by the feed rolls to the printing line to firmly and evenly press the work sheets about the platen as it is being moved to printing position and to hold them tightly across the printing line.

35. The combination in an accounting machine of a platen movable to and from printing position, an upper and a lower roller mounted on a pivoted yoke, means for normally urging the yoke to a position such that the lower roller first engages the work sheets on the platen as the platen is moved toward printing position and the upper roller engages them as it reaches printing position, a pivoted lever on which said yoke is mounted, and means for urging said lever toward said platen.

36. The combination in an accounting machine of a platen mounted so that it may be lowered to and raised from printing position, means for feeding work sheets about said platen while it is in raised position, means for clamping the work sheets to the platen while it is raised, and resiliently mounted rollers for engaging the work sheets as the platen is moved towards printing position, said rollers being mounted so as to travel progressively over said sheets away from the printing line and from where the sheets are held as the platen is lowered toward printing position to evenly press said sheets about the platen to hold them in tight position across the printing line.

37. The combination in a machine of the class described of a platen movable to and from printing position, feed rolls for clamping papers about said platen while it is out of printing position, a pivoted yoke having rotatable mounted upper and lower rollers on its ends, means urging said yoke to a position such that, as the platen is moved toward printing position, said lower roller first engages and moves over the papers in a direction away from where they are held by the feed rolls and away from the printing line and said upper roller subsequently engages the papers as the platen reaches its printing position.

38. The combination in an accounting machine of a platen movable to and from printing position, fingers for holding work sheets against said platen, and means for automatically moving said fingers to release the paper when the platen is moved to printing position.

39. In combination, a platen movable to and from printing position, a hand piece adapted to be grasped by an operator to move the platen to and from printing position, fingers for holding work sheets against said platen, means for normally holding said fingers out of engagement with the work sheets, and a controlling means for moving said fingers over work sheets on the platen, said controlling means having a portion located adjacent the hand piece so that when the operator grasps said hand piece to lift the platen from printing position he can easily grasp said portion of the controlling means to move the fingers into position to hold the papers as the platen is raised.

40. In combination, a platen movable to and from printing position, a pair of fingers for holding work sheets in engagement with said platen, means for normally maintaining said fingers out of position to engage the work sheets, means operable by a single lever for moving both of said fingers into engagement with work sheets, a latch for holding said lever in position to maintain said fingers in engagement with work sheets, and means for automatically releasing the latch when the platen is moved to printing position.

41. In combination, a platen, a cross shaft parallel to said platen, a pair of fingers pivotally mounted on bearings adjustable on said cross shaft, a rock shaft parallel to said cross shaft, cams on the rock shaft adapted to engage the fingers to swing them to and from one another longitudinally of the platen, and an operating means for rocking the shaft.

42. In combination, a platen, a cross shaft parallel to said platen, a pair of fingers pivotally mounted on bearings adjustable on said cross shaft, a rock shaft parallel to said cross shaft, cams on the rock shaft adapted to engage the fingers to swing them to and from one another longitudinally of the platen, an operating means for rocking the shaft, and a latch for said operating means.

43. In combination, a platen movable to and from printing position, a cross shaft parallel to said platen, a pair of fingers pivotally mounted on bearings adjustable on said cross shaft, a rock shaft parallel to said cross shaft, cams on the rock shaft adapted to engage the fingers to swing them to and from one another longitudinally of the platen, an operating means for rocking the shaft, a latch for said operating means, and means for tripping the latch as the platen is moved to printing position.

44. In combination, a platen movable to and from printing position, a finger piece for so moving the platen, a cross shaft parallel to the platen, a pair of fingers pivoted on bearings adjustably mounted on said shaft, a rock shaft parallel to the cross shaft, cams carried by the rock shaft adapted to engage the fingers to move them to and from one another longitudinally of the platen, an operating means for rocking said shaft having a thumb piece positioned adjacent the finger piece so that, as the operator grasps the finger piece to raise the platen, he also grasps the thumb piece to rock the shaft to move the fingers toward one another to hold work sheets in engagement with the platen.

45. A front-feed machine of the class described having a printing mechanism, a platen movable from printing position relative to said printing mechanism to a front-feed position and vice versa, means for holding a record sheet about said platen in feeding relation thereto, front-feed means for receiving and holding front-fed work sheets, said front-feed means being movable from closed to open-throat position and vice versa while the platen is away from its printing position, control means operable to move said platen with its record sheet from printing to front-feed position and said front-feed means to open-throat position, and means for guiding a work sheet under said platen from the front and into said open-throat while said platen is in front-feed position and said throat is open, said control means including portions operable to move said front-feed means to closed-throat position and said platen to printing position.

46. A front-feed machine of the class described having a printing mechanism, a platen movable from printing position relative to said printing mechanism to a front-feed position and vice versa, means for holding a record sheet about said platen in feeding relation thereto, front-feed means for receiving and holding front-fed work sheets, said front feed means being movable from closed to open-throat position and vice versa, control means operable to move said platen from printing position to front-feed and said front-feed means to open-throat position, means for guiding a work sheet under said platen from the front and into said open-throat while said platen is in front-feed position and said throat open, said control means including portions operable to close said front-feed throat to grip the inserted work sheet and portions operable subsequently to move said platen to printing position.

47. A front-feed machine of the class described having a printing mechanism, a platen movable from printing position relative to said printing mechanism to a front-feed position and vice versa, means for holding a record sheet about said platen in feeding relation thereto, front-feed means for receiving and holding front-fed work sheets, said front-feed means being movable from closed to open-throat position and vice versa, control means operable to move said platen from printing to front-feed position and said front-feed means to open-throat position, and a paper table for guiding a work sheet substantially horizontally under said platen from the front and into said open throat and for supporting said work sheet in said position, said control means including portions operable to move said front-feed means to closed-throat position to grip said inserted work sheet while in said horizontal position and portions operable to subsequently move said platen to printing position.

48. A front-feed machine of the class described having a printing mechanism, a platen urged toward printing position relative to said printing mechanism but movable out of printing position to a front-feed position, means for holding a record sheet about said platen in feeding relation thereto, front-feed means for receiving and holding front-fed work sheets, said front-feed means being movable from closed to open-throat position and vice versa but being urged to closed throat position, control means operable to move said platen from printing to front-feed position and said front-feed means to open-throat position, means for holding said platen in front-feed position, means for holding said front-feed means in open-throat position, and means for guiding a work sheet under said platen from the front and into said open-throat while said platen is in front-feed position and said throat is open, said control means including portions operable to release said front-feed holding means to enable said front-feed means to grip an inserted work sheet, said control means also including portions operable to subsequently release said platen holding means to enable the platen to move to printing position.

49. A front-feed machine of the class described having a printing mechanism, a platen movable from printing position relative to said printing mechanism to a front-feed position and vice versa, means for holding a record sheet about said platen in feeding relation thereto, feed rolls cooperating with said platen to form a front-feed throat, said feed rolls and platen being mounted to enable a relative movement to occur between them to open and close said front-feed throat, control means operable to move said platen from printing to front-feed position and to open said front-feed throat, and means for guiding a work sheet under said platen from the front while said platen is in front-feed position and said throat is open, said control means including portions operable to cause a relative movement between said platen and feed rolls to close said throat to grip said work sheet and portions subsequently operable to move said platen to printing position.

50. A front-feed machine of the class described having a printing mechanism, a platen movable from printing position relative to said printing mechanism to a front-feed position and vice versa, means for holding a record sheet about said platen in feeding relation thereto, feed rolls cooperating with said platen to form a front-feed throat, said feed rolls being movable relative to said platen to open and close said throat and being also movable with said platen as the latter is moved to and from printing position, control means operable to move said platen with its record sheet from printing to front-feed position and to separate said feed rolls from said platen to open said front-feed throat, and a front-feed paper table mounted in front of said platen for guiding a work sheet under said platen from the front and into said front-feed throat while the platen is in front-feed position and said throat open, said control means including portions operable to move said feed rolls into engagement with said platen to grip the inserted work sheet and portions subsequently operable to move said platen to printing position.

51. A front-feed machine of the class described having a printing mechanism, a platen movable from printing position relative to said printing mechanism to a front-feed position and vice versa, means for holding a record sheet about said platen in feeding relation thereto, feed rolls cooperating with said platen to form a front-feed throat, said feed rolls being movable relative to said platen to open and close said throat and being also movable with said platen as it moves into and out of printing position, means for moving said platen from printing to front-feed position, means for moving said feed rolls relative to said platen to open said throat, a front-feed paper table mounted in front of said platen for guiding a work sheet under said platen from the front and into said open front-feed throat while said platen is in front-feed position, means for holding said platen out of printing position, means for holding said feed rolls in open-throat position, and releasing means operable to release said feed rolls and said platen, said releasing means being operable to release said feed rolls to enable them to grip an inserted work sheet prior to movement of said sheet by said platen as it moves to printing position.

52. In a front-feed machine of the class described, a printing mechanism, a platen carried by a frame which is rockable to move said platen from printing position to a front-feed position and vice versa, said frame being urged in a direction to hold said platen in printing position, means for holding a record sheet about said platen in feeding relation thereto, feed rolls on said frame cooperating with said platen to form a front-feed throat, said feed rolls being movable relative to said platen to open and close said front-feed throat and being urged toward said platen to close said throat, control means operable to rock said frame to move the platen from printing to front-feed position and to move said feed rolls relative to said platen to open said front-feed throat, a front-feed paper table in front of said platen for guiding a work sheet under said platen from the front while said platen is in front-feed position and said throat is open, means for holding said feed rolls out of engagement with said platen, and means for holding said rocking frame in its front-feed position, said control means including portions operable to release said feed roll holding means and portions operable subsequently to release said rocking frame to enable said frame to move the platen to printing position.

53. A front-feed machine of the class described having a printing mechanism, means for holding a record sheet in printing position relative to said printing mechanism, front-feed means for receiving and holding a front-fed work sheet in printing position relative to said printing mechanism, said front-feed means being movable from closed to open-throat position and vice versa, a movable front-feed paper table at the front of said machine for receiving a work sheet and guiding it from the front into said front-feed throat while said throat is open, said table being movable from a work sheet receiving to a printing position and vice versa, means operable to close said front-feed throat, and means operable as said throat is closed to move said table to printing position.

54. A front-feed machine of the class described having a platen, means for holding a record sheet about said platen in feeding relation thereto, feed rolls cooperating with said platen to form a front-feed throat for receiving work sheets, said platen and feed rolls being mounted to enable relative movement to occur between them to open and close said front-feed throat, a pivoted front-feed paper table in front of said platen for receiving a work sheet and for guiding it under said platen from the front while said throat is open, said table being movable from a work sheet receiving to a printing position and vice versa, means operable to cause a relative movement between said feed rolls and platen to close said throat to grip the inserted sheet, and means operating automatically as said throat is closed to move said table to printing position.

55. A front-feed machine of the class described having a platen, means for holding a record sheet about said platen in feeding relation thereto, feed rolls cooperating with said platen to form a front-feed throat for receiving work sheets, said feed rolls being movable relative to said platen to open and close said front-feed throat, a pivoted front-feed paper table in front of said platen for receiving a work sheet and for guiding it from the front into said throat while the latter is open, said table being pivoted independent of said platen, and being movable from a work sheet receiving to a printing position and vice versa, and means operable to move said feed rolls into engagement with said platen to grip the inserted work sheet and to swing said paper table to a printing position.

56. A front-feed machine of the class described having a platen, means for holding a record sheet about said platen in feeding relation thereto, feed rolls cooperating with said platen to form a front-feed throat for receiving work sheets, said platen and feed rolls being mounted to enable a relative movement to occur between them to open and close said front-feed throat, a pivoted front-feed paper table in front of said platen occupying a substantially horizontal position when said throat is open to receive a work sheet and guide it horizontally under said platen from the front, means operable to cause a relative movement between said feed rolls and platen to close said throat and tilt said table to a substantially vertical position, and means operable to cause a relative movement between said platen and feed rolls to close said throat and cause said table to move to substantially horizontal position.

57. A front-feed machine of the class described having a printing mechanism, a platen carried by a frame which is rockable to move said platen from printing position relative to said printing mechanism to a front-feed position and vice versa, feed rolls carried by and movable with said frame, said feed rolls cooperating with said platen and being movable relative thereto to form a front-feed throat that may be opened and closed, means for rocking said frame to move the platen to front-feed position, means operable to move said feed rolls relative to said platen to open said throat, a front-feed table for receiving a work sheet and guiding it under said platen from the front while said platen is in front-feed position and said throat is open, said table being movable from a work sheet receiving to a printing position and vice versa, said feed roll moving means including portions operable to move said feed rolls into engagement with said platen to close said throat while the platen is out of printing position, and said frame rocking means being operable to subsequently move said platen to printing position and move said table to printing position.

58. A front-feed machine of the class described having a printing mechanism, means for holding a record sheet in printing position relative to said printing mechanism, front-feed means for receiving and holding front-fed work sheets, said front-feed means being movable from closed to open-throat position and vice versa, means for moving said front-feed means to open-throat position, a front-feed collating table at the front of said machine for guiding work sheets substantially horizontally into said open-throat from the front, said table having provisions for collating said work sheets face downward at the front while in said open throat, and means operable to move said front-feed means to closed-throat position to grip said work sheets while in collated and substantially horizontal position and to subsequently move the unfed ends of said sheets to substantially vertical position.

59. A front-feed machine of the class described having a printing mechanism, a platen movable from printing position relative to said printing mechanism to a front-feed position and vice versa, means for holding a record sheet about said platen in feeding relation thereto, front-feed means for receiving and holding front-fed work sheets, said front-feed means being movable from closed to open-throat position and vice versa, means operable to move said platen from printing to front-feed position and said front-feed means to open-throat position, a front-feed collating table in front of said platen for guiding work sheets horizontally under said platen from the front and into said open-throat, said table having provisions for collating said sheets face downward in horizontal position in front of said platen while the sheets are in said open throat, and means operable to close said front-feed throat to grip the collated work sheets while they are in substantially horizontal position and to subsequently move said platen to printing position and the unfed ends of said work sheets to substantially vertical position.

60. A front-feed machine of the class described having a printing mechanism, means for holding a record sheet in printing position relative to said printing mechanism, front-feed means for receiving and holding front-fed work sheets, said front-feed means being movable from closed to open-throat position and vice versa, means operable to move said front-feed means to open-throat position, a pivoted front-feed collating table at the front of said machine for guiding work sheets horizontally into said throat while it is open, said table having provisions for collating said work sheets face downward in horizontal position at the front of said machine while the papers are in said open throat, and means operable to close said front-feed throat to grip said collated work sheets and to subsequently tilt said collating table to a substantially vertical position.

61. A front-feed machine of the class described having a printing mechanism, a platen movable from printing position relative to said printing mechanism to a front-feed position and vice versa, front-feed means for receiving and holding front-fed work sheets, said front-feed means being movable from closed to open-throat position and vice versa, means operable to move said platen from printing to front-feed position and said front-feed means to open-throat position, a pivoted front-feed collating table in front of said platen for guiding work sheets substantially horizontally under said platen from the front and into said open throat, said table having provisions for collating said work sheets face downward in front of said platen while they are in said open throat, and means operable to close said front-feed throat to grip said work sheets and to subsequently move said platen to printing position and to tilt said paper table out of horizontal position.

62. A machine of the class described having a printing mechanism, a platen, a collating table in front of said platen for receiving and guiding work sheets under said platen, said table having collating marks thereon, means for gripping work sheets positioned on said table and for holding them in printing position relative to said printing mechanism, and means operating automatically during an operation of said machine to print collating marks on the backs of said sheets so that said sheets may be collated relative to said marks on said collating table when said sheets are next inserted in the machine.

63. A front-feed machine of the class described having a printing mechanism, a platen, a collating table in front of said platen for receiving and guiding work sheets under said platen from the front, collating marks on said table for collating said sheets face downward in front of said platen, means for gripping said collated sheets and holding them in printing position relative to said printing mechanism, and means operating automatically during a machine operation to print a collating mark on the back of said sheets so that said sheets may be collated relative to the mark on said collating table when they are next inserted in the machine.

64. A front-feed machine of the class described having a printing mechanism, a platen, means for holding a record sheet about said platen in feeding relation thereto, front-feed means for receiving and holding front-fed work sheets, said front-feed means being movable from closed to open throat position and vice versa, a collating table in front of said platen for guiding work sheets horizontally under said platen from the front and into said front-feed throat while it is open, collating marks on said table for collating said work sheets face downward while in horizontal position under said platen and in said open throat, means operable to close said front-feed throat to grip the collated work sheets and hold them in printing position, and means operating automatically during a machine operation to print a collating mark on said inserted work sheets in order that said sheets may be collated relative to the marks on said table when said sheets are next inserted in the machine.

65. A front-feed machine of the class described having a printing mechanism, means for holding a record sheet in printing position relative to said printing mechanism, front-feed means for receiving and holding a front-fed work sheet in printing position relative to said printing mechanism, said front-feed means being movable from closed to open-throat position and vice versa, means for moving said front-feed means to open-throat position, means for guiding a work sheet substantially horizontally into said throat from the front while said throat is open, means operable to close said front-feed throat to grip said inserted sheet, and means operating subsequently to move the unfed end of the inserted work sheet to a substantially vertical position.

66. A front-feed machine of the class described having a platen, means for holding a record sheet about said platen in feeding relation thereto, feed rolls cooperating with said platen to form a front-feed throat for receiving and holding front-fed work sheets, said feed rolls and platen being mounted to enable a relative movement to occur between them to open and close said throat, means operable to cause a relative movement between said platen and feed rolls to open said front-feed throat, means for guiding a work sheet substantially horizontally into said throat from the front while said throat is open, means operable to cause a relative movement between said platen and feed rolls to close said throat, and means operating subsequently to move the unfed end of the inserted work sheet to a substantially vertical position.

67. A front-feed machine of the class described having a printing mechanism, a platen movable from printing position relative to said printing mechanism to a front-feed position and vice versa, front-feed means for receiving and holding front-fed work sheets, said front-feed means being movable from closed to open-throat position and vice versa, control means operable to move said platen from printing to front-feed position and said front-feed means to open-throat position, means for guiding a work sheet under said platen from the front and into said open front-feed throat while said platen is in front-feed position, said control means being operable to close said front-feed throat while said platen is out of printing position and to move said platen to printing position, and means operating automatically as said platen is moved to printing position to move the unfed end of the inserted work sheet to a substantially vertical position.

68. A front-feed machine of the class described having a printing mechanism, a platen movable from printing position relative to said printing mechanism to a front-feed position and vice versa, front-feed means for receiving front-fed work sheets, said front-feed means being movable from closed to open-throat position and vice versa, control means operable to move said platen from printing to front-feed position and said front-feed means to open-throat position, means for guiding a work sheet under said platen from the front and into said open-throat while said platen is in front-feed position and said throat open, said control means being operable to close said front-feed throat to grip the inserted work sheets while said platen is out of printing position and to move said platen to printing position, and means operating automatically as said platen is moved toward printing position to press the unfed end of the inserted work sheet evenly about said platen and to hold it tightly against the platen across the printing line.

69. A front-feed machine of the class described having a printing mechanism, a platen movable from printing position relative to said printing mechanism to a front-feed position and vice versa, front-feed means for receiving and holding front-fed work sheets, said front-feed means being movable from closed to open-throat position and vice versa, control means operable to move said platen from printing to front-feed position and said front-feed means to open-throat position, means for guiding a work sheet substantially horizontally under said platen from the front and into said open-throat while said platen is in front-feed position, said control means being operable to close said front-feed throat and move said platen to printing position, means operating automatically to move the unfed end of the inserted work sheet to a substantially vertical position as said platen is moved to printing position, said last named means acting to automatically release the unfed end of said work sheet to permit it to return to horizontal position when said platen is moved out of printing position, and mechanism optionally operable as said platen is moved out of printing position for holding the unfed end of the inserted work sheet in vertical position.

70. In a front-feed machine of the class described, a printing mechanism, a platen movable from printing position relative to said printing mechanism to a front-feed position and vice versa, front-feed means for receiving and holding a front-fed work sheet, said front-feed means being movable from closed to open-throat position and vice versa, means operable to move said platen from printing to front-feed position and said front-feed means to open-throat position, means for guiding a work sheet under said platen from the front and into said throat while it is open, means operable to close said throat and move said platen to printing position, and means compelling said front-feed throat to be closed as a condition precedent to the movement of said platen to printing position.

71. A front-feed machine of the class described having a printing mechanism, a platen movable from printing position relative to said printing mechanism to a front-feed position and vice versa, front-feed means for receiving and holding front-fed work sheets, said front-feed means being movable from closed to open-throat position and vice versa, control means operable to move said platen from printing to a front-feed position and said front-feed means to open-throat position, means for guiding a work sheet under said platen and into said open-throat while said platen is in front-feed position, said control means being operable to close said front-feed throat and move said platen to printing position and means acting to arrest said platen in its movement toward printing position when said movement occurs with said front-feed throat open.

72. A front-feed machine of the class described having a printing mechanism, a platen having a printing line, means for holding a record sheet about said platen, front-feed means for receiving and holding front-fed work sheets, said front-feed means being movable from closed to open throat position and vice versa, a front-feed paper table for guiding work sheets bottom end first into said throat while it is open, said table being provided with means for enabling an inserted work sheet to be accurately positioned in said open throat so that it will be in proper position relative to the printing line of said platen when said throat is closed, said front-feed means being movable to closed throat position to grip an inserted work sheet while said sheet is positioned in said throat to thereby hold it in position, and means operable subsequently to move the unfed end of said inserted sheet about said platen to hold said sheet in printing position.

73. A front-feed machine of the class described having a printing mechanism, a platen having a printing line, said platen being movable from printing position relative to said printing mechanism to a front-feed position and vice versa, means for holding a record sheet about said platen, front-feed means for receiving and holding front-fed work sheets, said front-feed means being movable from closed to open throat position and vice versa, a paper table for guiding work sheets bottom end first into front-fed position relative to said platen and into said open front-feed throat, said table being provided with a reference line by means of which an inserted work sheet may be accurately positioned in said open throat so as to be in proper position relative to the printing line of said platen when said platen is moved to printing position, and means operable to close said front-feed throat to grip the positioned work sheet while the platen is in front feed position and to subsequently move said platen to printing position.

74. A front-feed machine of the class described having a printing mechanism, a platen having a printing line, said platen being movable from a printing position relative to said printing mechanism to a front-feed position and vice versa and being urged toward printing position, means for holding a record sheet about said platen, feed rolls cooperating with said platen to form a front-feed throat, said feed rolls being movable relative to said platen to open and close said throat and being urged toward said platen, a pivoted paper table for guiding work sheets bottom end first into front-fed position relative to said platen and into said open front-feed throat, said table being provided with a reference line by means of which an inserted work sheet may be accurately positioned in said open throat so as to be in proper position relative to the printing line of said platen when said platen is moved to printing position, means for holding said platen in front-feed position and said feed rolls in open throat position, and means operable to release said feed rolls to enable them to grip an inserted work sheet against said platen while said platen is in front-feed position and operable to subsequently release said platen to enable it to move to printing position.

75. A machine of the class described having a printing mechanism, a platen having a printing line, a front-feed paper table for guiding work sheets bottom end first into front-fed position relative to said platen, said table being movable from a work-sheet-receiving to a printing position, feed rolls adapted to engage said platen above said printing line, and means operable to move said table from sheet-receiving to printing position and said feed rolls into engagement with an inserted work sheet above said printing line.

76. A machine of the class described having a printing mechanism, a platen having a printing line, a front-feed paper table for receiving and guiding work sheets bottom end first into front-fed position relative to said platen, work sheet holding means movable into and out of engagement with said platen on one side of said printing line, feed rolls adapted to engage said platen on the other side of said printing line, said paper table being movable from a sheet-receiving to a printing position, and means operable to move said holding means to holding position, to move said table from sheet-receiving to printing position, and to move said feed rolls into engagement with an inserted work sheet.

77. A front-feed machine of the class described having a printing mechanism, a platen having a printing line, means for holding a record sheet about said platen, a front-feed paper table for guiding work sheets bottom end first into front-fed position relative to said platen, said table being movable from a work-sheet-receiving to a printing position and vice versa, movable sheet holding devices adapted to engage the portion of an inserted work sheet that has not yet reached the printing line of said platen, and a single manipulative means operable to move said table from sheet-receiving to printing position and said holding devices into engagement with said inserted work sheet to press the latter against said platen.

78. A front-feed machine of the class described having a platen, feed rolls cooperating with said platen to form a front-feed throat, said feed rolls being movable relative to the platen to open and close said throat, a pivoted front-feed paper table for guiding work sheets bottom end first into front-fed position relative to said platen and into said open throat, said table being movable from a work-sheet-receiving to a printing position and vice versa, and means operable to close said throat and move said paper table from work-sheet-receiving to printing position.

79. A front-feed machine of the class described having a printing mechanism, a platen having a printing line, means for holding a record sheet about said platen, a front-feed paper table for receiving and guiding a work sheet bottom end first into front-fed position relative to said platen, said paper table being movable from a work-sheet-receiving to a printing position and vice versa, means for enabling an inserted work sheet to be properly positioned relative to the printing line of said platen, holding devices for holding an inserted work sheet in position during a printing operation of said printing mechanism, and means operable to move said table from work-sheet-receiving to printing position and said holding devices to holding position.

80. A front-feed machine of the class described having a printing mechanism, a platen having a printing line, means for holding a record sheet about said platen, front-feed means for receiving and holding a front-fed work sheet, said front-feed means being movable from closed to open throat position and vice versa, a front-feed paper table for receiving a work sheet and guiding it bottom end first into said throat while said throat is open, said table being movable from a work-sheet-receiving position to a printing position and vice versa, means for enabling an inserted work sheet to be accurately positioned relative to the printing line of said platen, and means operable to close said front-feed throat and move said table to printing position after said inserted sheet has been properly positioned.

81. A front-feed machine of the class described having a printing mechanism, a platen having a printing line, means for holding a record sheet about said platen, a front-feed paper table for receiving and guiding a work sheet bottom end first into front-fed position relative to said platen, said paper table being movable from a sheet-receiving to a sheet-holding position and vice versa, means for enabling an inserted work sheet to be properly positioned relative to the printing line of said platen, feed rolls adapted to be moved into and out of engagement with said platen on the side of said printing line opposite to the side on which said work sheet is inserted, and means operable to move said table from sheet-receiving to sheet-holding position and to cause said feed rolls to engage said platen.

82. A front-feed machine of the class described having a printing mechanism, a platen having a printing line, means for holding a record sheet about said platen, a pivoted paper table for receiving and guiding a work sheet bottom end first into front-fed position relative to said platen, said paper table being swingable from a work-sheet-receiving to a printing position and vice versa, a reference line on said table by means of which an inserted work sheet may be positioned relative to the printing line of said platen, holding means for holding an inserted work sheet about said platen during a printing operation of said printing mechanism, and means operable to swing said table from work-sheet-receiving to printing position and to move said holding means to holding position.

83. A front-feed machine of the class described having a printing mechanism, a platen having a printing line, means for holding a record sheet about said platen, a paper table for receiving work sheets and guiding them bottom end first into front-fed position relative to said platen, said table being movable from a work-sheet-receiving to a printing position and vice versa, means for enabling an inserted work sheet to be properly positioned relative to the printing line of said platen, devices for engaging an inserted work sheet on opposite sides of the printing line of said platen, and means operable to move said table to printing position after a work sheet has been inserted and to cause said devices to engage said work sheet on opposite sides of said printing line to hold said work sheet in position during a printing operation of said printing mechanism.

84. A front-feed machine of the class described having a printing mechanism, a platen having a printing line, means for holding a record sheet about said platen, a pivoted paper table for receiving work sheets and guiding them bottom end first into front-fed position relative to said platen, means on said table for enabling an inserted work sheet to be properly positioned relative to the printing line of the platen, a device for engaging an inserted work sheet on one side of the printing line of said platen, a device for engaging said inserted work sheet on the opposite side of the printing line of said platen, and means operable to swing said paper table to printing position and to cause both of said paper engaging devices to engage an inserted work sheet to hold said work sheet in position during an operation of said printing mechanism.

85. A front-feed machine of the class described having a printing mechanism, a platen movable from a printing position relative to said printing mechanism to a front-feed position and vice versa, feed rolls cooperating with said platen to form a front-feed throat, said feed rolls being movable relative to said platen and movable with said platen as it is moved from printing to front-feed position and vice versa, means for holding the platen in front-feed position when it is moved to such a position, and manually manipulative means operable, when said manipulative means is moved in one direction, to move said platen from printing to front-feed position, said feed rolls away from said platen to open said throat, and to render said platen holding means effective, said manipulative means being also operable when moved in the opposite direction, to release said platen from said holding means, to move said feed rolls into engagement with said platen to close said throat, and to move said platen from front-feed to printing position.

86. A front-feed machine of the class described having a printing mechanism, a platen movable from a printing position relative to said printing mechanism to a front-feed position and vice-versa, feed rolls cooperating with said platen to form a front-feed throat, said feed rolls being movable relative to said platen to open and close said throat, a pivoted front-feed paper table for guiding work sheets bottom end first into said throat when it is open, and means operable to move said platen from one of its positions to the other and to automatically swing said paper table to widen the gap between said table and platen during one of said movements of said platen.

ROBERT L. MULLER.